United States Patent [19]
Kikuchi et al.

[11] Patent Number: 5,291,207
[45] Date of Patent: Mar. 1, 1994

[54] METHOD FOR ESTIMATING POSITION OF OBJECTIVE OBSTACLE FOR VEHICLE

[75] Inventors: Hayato Kikuchi; Yasuhiko Fujita; Toshiaki Arai; Yoshikazu Tsuchiya; Makoto Sato; Kunio Nanno, all of Wako, Japan

[73] Assignee: Honda Giken Kogyo Kabushiki Kaisha, Tokyo, Japan

[21] Appl. No.: 997,970

[22] Filed: Dec. 28, 1992

[30] Foreign Application Priority Data

Dec. 27, 1991 [JP] Japan .................. 3-347495

[51] Int. Cl.$^5$ .................. G01S 13/60; G01S 13/08
[52] U.S. Cl. .................. 342/70; 342/125
[58] Field of Search .............. 342/70, 118, 125, 126

[56] References Cited

U.S. PATENT DOCUMENTS

| | | | |
|---|---|---|---|
| 3,898,655 | 8/1975 | Tresselt | 342/83 |
| 4,083,047 | 4/1978 | Schalow | 342/46 |
| 4,379,497 | 4/1983 | Hainsworth et al. | 342/70 X |
| 4,552,456 | 11/1985 | Endo | 342/70 X |
| 4,757,450 | 7/1988 | Etoh | 342/70 X |
| 4,804,961 | 2/1989 | Hane | 342/125 |
| 5,008,543 | 4/1991 | Bertrand et al. | 342/126 X |

*Primary Examiner*—John B. Sotomayor
*Attorney, Agent, or Firm*—Armstrong, Westerman, Hattori, McLeland & Naughton

[57] ABSTRACT

In a vehicle equipped with a distance measuring unit capable of measuring a distance between the subject vehicle and an objective obstacle, the objective obstacle is detected along a widthwise direction of the vehicle by the distance measuring unit. Detection data detected by the distance measuring unit are developed on X and Y coordinates in which the widthwise direction of the subject vehicle is represented by an X axis; the longitudinal direction of the subject vehicle is represented by a Y axis, and the position of the subject vehicle is defined as an origin. Each of obstacle data is labeled in such a manner that the same labels are affixed to obstacle data which are in proximity to one another on the coordinates. The amount and direction of movement are calculated for every label on the basis of the last data and the current data, and a relative speed for every label relative to the subject vehicle is calculated by dividing the amount of movement by a sampling time. The position of the objective obstacle after a lapse of a predetermined time is estimated on the basis of a relative speed vector determined from the relative speed and the direction of movement. Thus, the accuracy of estimating of the position of the objective obstacle is improved.

3 Claims, 6 Drawing Sheets

METHOD FOR ESTIMATING POSITION OF OBJECTIVE OBSTACLE FOR VEHICLE

BACKGROUND OF THE INVENTION

1. Field of the Invention

The present invention relates to a method for correctly estimating a position of an objective obstacle, in a vehicle equipped with a distance measuring unit which comprises a transmitting and receiving section capable of transmitting a signal toward the objective obstacle and receiving a reflected signal from the objection obstacle, and a calculating section for calculating a distance between the subject vehicle and the objective obstacle on the basis of a time between the transmission and the reception of the signals.

2. Description of the Prior Art

A collision preventing system for a vehicle is conventionally known, for example, from Japanese Patent Publication No. 4700/86, in which a distance between a subject vehicle and an objective obstacle is measured by the distance measuring unit, and a brake device is operated in accordance with the distance between the subject vehicle and the objective obstacle.

In estimating the position of the objective obstacle, it is necessary to correctly grasp the number of distribution of objective obstacles which lie ahead of the subject vehicle. However, such a method for correctly estimating the position of the objective obstacle is not know heretofore.

SUMMARY OF THE INVENTION

It is an object of the present invention to provide a method for estimating the position of an objective obstacle in a vehicle, wherein the accuracy of estimation of the position of the objective obstacle is improved.

According to a first aspect and feature of the present invention, a method for estimating a position of an objective obstacle comprises the steps of: detecting the objective obstacle along a widthwise direction of the subject vehicle by the distance measuring unit; developing detection data detected by the distance measuring unit on X and Y coordinates in which the widthwise direction of the subject vehicle is represented by an X axis, the longitudinal direction of the subject vehicle is represented by a Y axis, and the position of the subject vehicle is defined as an origin; labeling each obstacle data in such a manner that the same labels are affixed to obstacle data which are in proximity to one another on the coordinates; calculating the amount and direction of movement for every label on the basis of the last data and current or now data; calculating a relative speed for every label relative to the subject vehicle by dividing the amount of movement by a sampling time; and, estimating the position of the objective obstacle, after a lapse of a predetermined time, on the basis of a relative speed vector determined from the relative speed and the direction of movement.

With the above feature of the present invention, the number and distribution of a plurality of objective obstacles can be determined from the labeling, and the positions of the objective obstacles can be correctly estimated in total by calculating the relative speed for every label.

According to the second aspect and feature of the present invention, positions of gravity centers are determined for every label, and the direction and amount of movement for every labels are calculated by comparing such positions of gravity centers with each other.

With the above second feature, it is possible to simply and reliably calculate the directions and amounts of movement for the every labels.

According to a third aspect and feature of the present invention, the position of gravity center for every next label is estimated on the basis of the relative speed vector, and the position of gravity center the last time estimated for every label is compared with the current or present position of the gravity center, whereby the directions and amounts of movement are calculated for only mutually substantially corresponding labels.

With the above third feature, it is possible to ensure that a sudden variation in detection data due to a noise is eliminated, thereby avoiding misjudgment.

The above and other objects, features and advantages of the invention will become apparent from the following description of the preferred embodiments, taken in conjunction with the accompanying drawings.

BRIEF DESCRIPTION OF THE DRAWINGS

FIGS. 1 to 5 illustrate a collision preventing system for a vehicle of the first embodiment of the present invention, wherein

DESCRIPTION OF THE PREFERRED EMBODIMENTS

A first embodiment of the present invention will now be described in connection with FIGS. 1 to 5.

Figure 1:
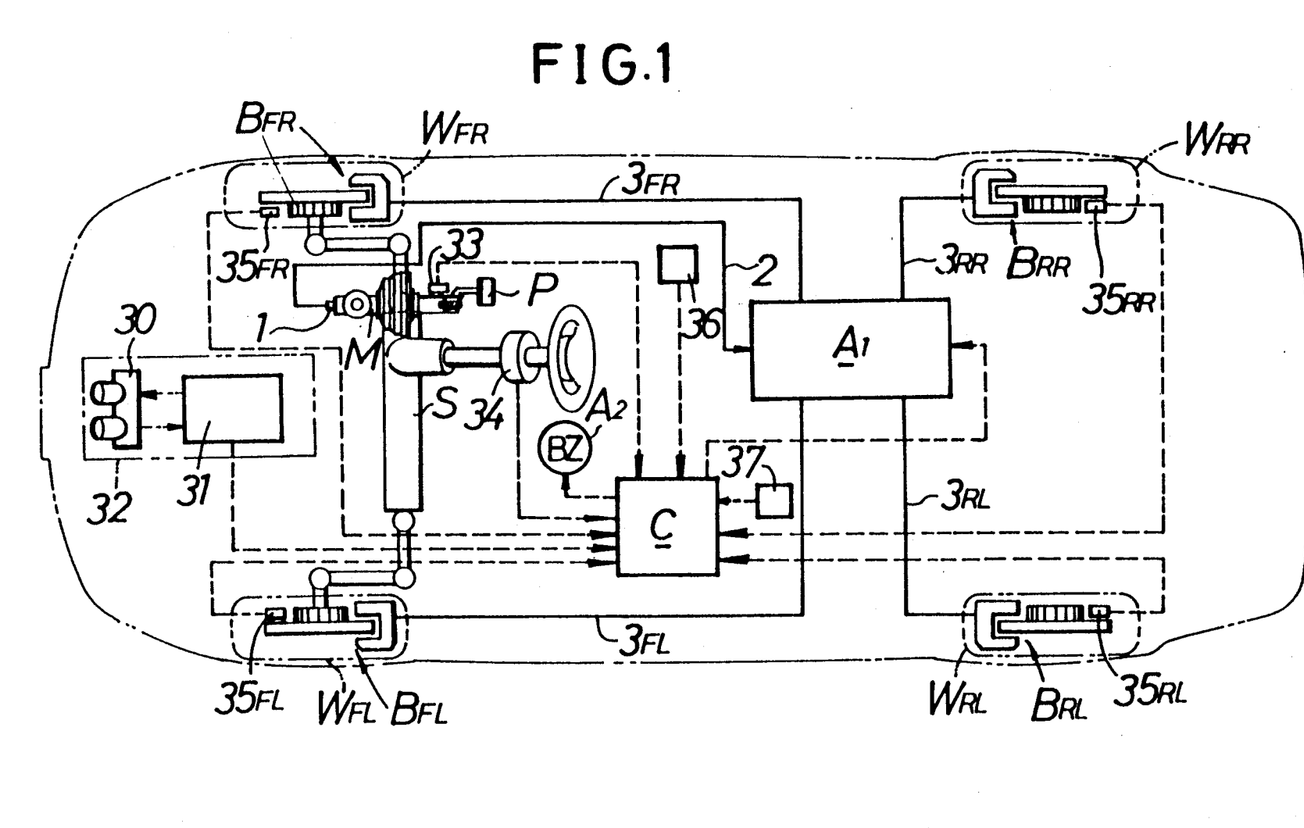
FIG. 1 is a diagram illustrating the arrangement of the vehicle.

Referring first to FIG. 1, in an automobile vehicle V, a left frontal wheel disk brake $B_{FL}$ and right from wheel disk brake $B_{FR}$ are mounted on left front wheel $W_{FL}$ and right front wheel $W_{FR}$, respectively, connected to device S. Left rear wheel disk brake $B_{RL}$ and right rear wheel disk brake $B_{RR}$ are mounted on left rear wheel $W_{RL}$ and right rear wheel $W_{RR}$, respectively.

An oil passage 2 is connected to output 1 in master cylinder M for delivering hydraulic braking pressure, corresponding to the depressing operation of brake pedal P. An electric-powered hydraulic pressure producing means A, as an actuator, is interposed between oil passage 2 and oil passages $3_{FL}$, $3_{FR}$, $3_{RL}$ and $3_{RR}$ independently connected to disk brakes $B_{FL}$, $B_{FR}$, $B_{RL}$ and $B_{RR}$, respectively. The electric-powered hydraulic pressure producing means $A_1$ is shiftable between an inoperative state in which the oil passage 2 and each of the oil passages $3_{FL}$, $3_{FR}$, $3_{RL}$, and $3_{RR}$ are in communication with each other, for permitting the hydraulic braking pressure from the master cylinder M to be applied to each of the disk brakes $B_{FL}$, $B_{FR}$, $B_{RL}$ and $B_{RR}$, and inoperative state in which the communication between the oil passage 2 and each of the oil passages $3_{FL}$, $3_{FR}$, $3_{RL}$ and $3_{RR}$ is cut off, and hydraulic pressure, produced by the electric-powered hydraulic pressure producing means $A_1$, is applied to each of the disk brakes $B_{FL}$, $B_{FR}$, $B_{RL}$ and $B_{RR}$.

Figure 2:
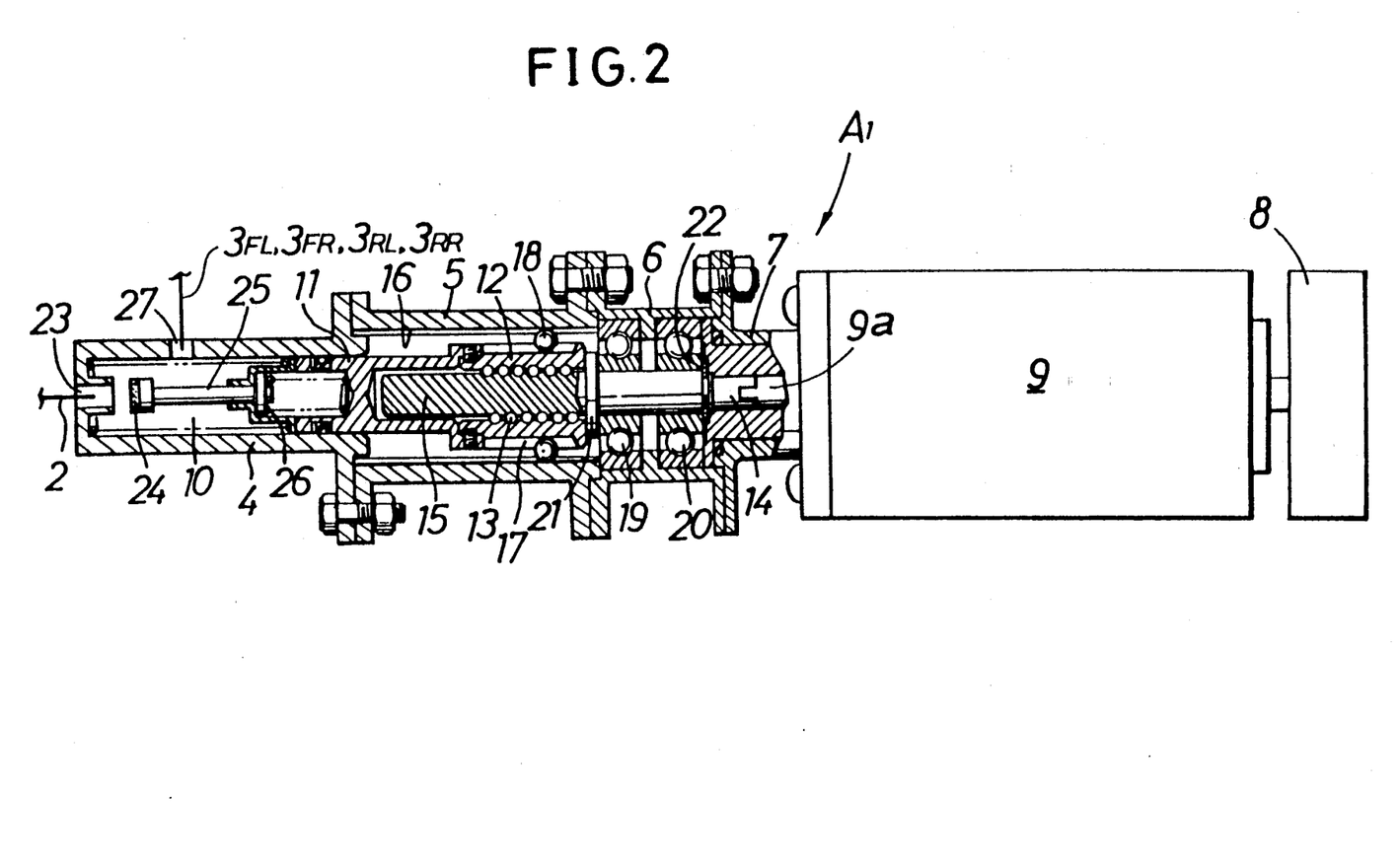
FIG. 2 is a longitudinal sectional side view of an electric-powered hydraulic pressure producing means of the first embodiment.

Referring to FIG. 2, electric-powered hydraulic pressure producing means $A_1$ comprises a cylinder 4 formed into a bottomed cylindrical shape with its tip end closed. A cylindrical guide 5 is coaxially connected to a rear end of the cylinder 4. A cylindrical support 6 is coaxially connected to the cylindrical guide 5. A cylindrical connecting member 7 is coaxially connected to the cylindrical support 6. A motor 9, having an encoder 8, is coaxially connected to the cylindrical connecting member 7. A piston is slidably received in the cylinder 4 to define a pressure chamber 10 between the piston 11, itself, and the closed end of the cylinder 4. A cylindrical nut member 12 is disposed within the cylindrical guide 5 for inhibited rotation about an axis of the nut member 12, and is coaxially connected to a rear end of the piston 11. A rotary shaft 15 is coupled to the nut member 12, through a ball screw 13, and connected to an output shaft 9a of the motor 9 through an Oldham's joint 14.

A plurality of axially extending grooves 16 and 17 are provided in an inner surface of the cylindrical guide 5 and an outer surface of the nut member 12, respectively, in correspondence to each other. A ball 18 is received in each of these mutually corresponding grooves 16 and 17, thereby inhibiting the rotation of the nut member 12 and, thus, the piston 11 about an axis thereof. The rotary shaft 15 is rotatably carried in the cylindrical support 6 with a pair of ball bearings 19 and 20 interposed therebetween. A collar 21 is provided on the rotary shaft 15 and extends radially outwardly. A retaining ring 22 is mounted around the rotary shaft 15. The axial movement of the rotary shaft 15 is inhibited by engagement of the collar 21 and the retaining ring 2 with axially outer ends of inner peripheries of the ball bearings 19 and 20, respectively.

The cylinder 4 is provided at a front end thereof, with a valve bore 23 leading to the oil passage 2, connected to the master cylinder M. A valve member 24, capable of opening and closing the valve bore 23, is retained on the piston 11. More specifically, a rod 25 is retained at is rear end on the front end of the piston 11 for axial relative movement in a predetermined range, and the valve member 24 is mounted on the front end of the rod 25. A spring is compressed between the rod 25 and the piston 11 for biasing the rod 25 and, thus, the valve member 24 toward the valve bore 23.

Cylinder 4 is provided with an output port 27 which leads to the pressure chamber 10. The oil passage $3_{FL}$, $3_{FR}$, $3_{RL}$ and $3_{RR}$ independently leading to the disk brakes $B_{FL}$, $B_{FR}$, $B_{RL}$ and $B_{RR}$ are connected to the output port 27.

In such electric-powered hydraulic pressure producing means $A_1$, the piston 11 is reciprocally axially moved by the ball screw 13 in response to the normal and reverse rotations of the motor 9. When the piston 11 is moved forwardly, the valve bore 23 is closed by the valve member 24, and a hydraulic pressure corresponding to the amount of piston 11 moved is generated in pressure chamber 10 and applied to each of the disk brakes $B_{FL}$, $B_{FR}$, $B_{RL}$ and $B_{RR}$.

Referring again to FIG. 1, a distance measuring unit 32 is mounted at a front portion of the automobile vehicle. The distance measuring unit 32 comprises a transmitting and receiving section 30 capable of transmitting a signal forwardly from the vehicle and receiving a reflected signal from an objective obstacle, and a calculating section 31 for calculating a distance between the subject vehicle and the objective obstacle on the bases of the time from the transition to the reception. The distance measuring unit 32 is capable of scanning in a widthwise direction of the vehicle to detect the distance from the subject vehicle to the objective in a given range in the widthwise direction of the vehicle.

The brake pedal P is provided with a depression force sensor 33, and the steering device S is provided with a steering angle sensor 34. Wheel speed sensors $35_{FL}$, $35_{FR}$, $35_{RL}$ and $35_{RR}$ are mounted to the wheels for independently detecting the wheel speeds, respectively. Signals from the sensors 33, 34, $35_{FL}$, $35_{FR}$, $35_{RL}$ and $35_{RR}$ and the distance measuring unit 32 are supplied into an electronic control unit C. Further, signals from a yaw rate sensor 36 for detecting yaw rate of the vehicle and from an vigalence degree detector 37 and also supplied into the electronic control unit C. The vigalence degree detector 37, which may be used, is those for analyzing frequency components for driver's driving operations (e.g., an operation of the accelerator and a steering operation), for analyzing the conditions of motion of the vehicle (e.g., whether, or not, each of the longitudinal acceleration and lateral acceleration exceeds a present value, or the like), for monitoring the movements of driver's eyeballs and eyelids, and for metering physiological phenomenons, such as the driver's brain wave, pulsation and skin resistance. When the vigalence degree is reduced to a level less than a predetermined value, a high level signal is delivered from the vigalence degree detector 37.

The electrical control unit C controls the operation of the electric-powered hydraulic pressure producing means $A_1$ on the basis of the signals from the distance measuring unit 31, the wheel speed sensors $35_{FL}$, $35_{FR}$, $35_{RL}$ and $35_{RR}$, the yaw rate sendor 36 and the vigalence degree detector 37, and controls an alarm $A_2$ as an actuator.

Figure 3:
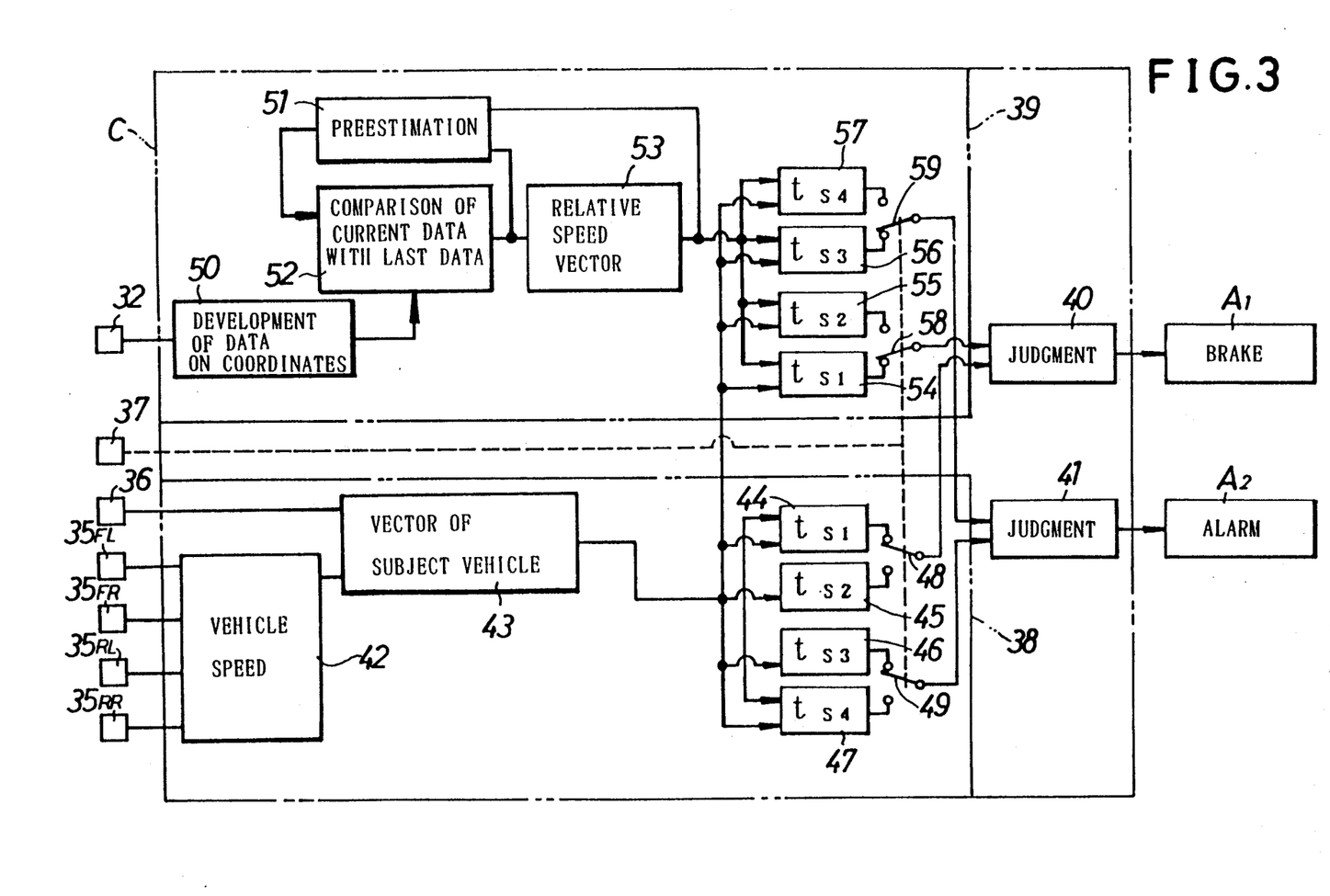
FIG. 3 is a block diagram illustrating an arrangement of an essential portion of an electronic control unit of the instant invention.

Referring to FIG. 3, the electronic control unit C comprises a subject vehicle position estimating means 38, an obstacle position estimating means 39, and first and second judging means 40 and 41.

The subject vehicle position estimating means 38 comprises a vehicle speed calculating section 42 for calculating vehicle speed on the basis of detection values detected by the wheel speed sensors $35_{FL}$, $35_{FR}$, $35_{RL}$ and $35_{RR}$; a subject vehicle vector calculating section 43 for determining a vector of the subject vehicle on the basis of a yaw rate detected by the yaw rate sensor 36 and by a vehicle speed obtained in the vehicle speed calculating section 42; first, second, third and fourth subject vehicle position calculating sections 44, 45, 46 and 47; a switchover section 48 for selecting either one of outputs from the first and second subject vehicle position calculating sections 44 and 45 in accordance with an output signal from the vigalence degree detector 37 to supply it to the first judging means 40; and a switchover section 49 for selecting either one of outputs from the third and fourth subject vehicle position calculating section 46 and 47 in accordance with the output signal from the vigalence degree detector 37 to supply to the second judging means 41.

In each of the first, second, third and fourth subject vehicle position calculating sections 44, 45, 46 and 47, supposing that the braking is started at a certain time, the subject vehicle vector based on the travel speed and direction of the subject vehicle is multiplied by a preset time, thereby calculating the position of the subject vehicle after a lapse of the preset time from the braking starting time. More specifically, if the travel speed of the subject vehicle is represented by $V_1$ and the calculation time required from the detection to the delivery is by $t_o$, and if the preset time is represented by $t_s$ and the present deceleration during braking is represented by $\alpha_1$, a travel distance $L_1$ of the subject vehicle in a travelling direction for a period of time from the braking starting time until the preset time is lapsed is determined basically according to the following expressions (1) and (2) in the first to fourth subject vehicle position calculating sections 44 to 47:

$$\alpha t = t_s - t_o \qquad (1)$$

$$L_1 = V_1 \cdot t_o + V_1 \cdot \Delta t - 0.5 x_1 \cdot \Delta T^2 \qquad (2)$$

Here, a first preset time $t_{s1}$, e.g., 1.5 sec shorter than the time enough to avoid the collision of the subject vehicle against an objective obstacle ahead of the vehicle by the steering or braking operation in a condition of the driver having a high vigalence degree, is set in the first subject vehicle position calculating section 44. A second preset time $t_{s2}$, e.g., 1.8 sec longer than the first preset time $t_{s1}$, is set in the second subject vehicle position calculating section 45. A third preset time $t_{s3}$, e.g., 2.5 sec longer than the second preset time $t_{s1}$, is set in the third subject vehicle position calculating section 46. A fourth preset time $t_{s4}$, e.g., 2.8 sec longer than the third preset time $t_{s3}$, is set in the fourth subject vehicle position calculating section 47. Thus, in each of the subject vehicle position calculating sections 44 to 47, the calculations, according to the above-described expressions, are carried out on the basis of each of the preset times $t_{s1}$ to $t_{s4}$ independently set therein, thereby estimating the position of the subject vehicle after a lapse of each of the preset times $t_{s1}$ to $t_{s4}$ from the braking starting time point.

The switchover section 48 is adapted to supply the output from the first subject vehicle position calculating section 44 into the judging means 40, when the output from the vigalence degree detector 37 is of a high level, i.e., when the vigalence degree of the driver is sufficiently high, and to supply the output from the second subject vehicle position calculating section 45 into the judging means 40, when the output from the vigalence degree detector 37 becomes a low level, i.e., when the vigalence degree of the driver is decreased. The switchover section 49 is adapted to supply the output from the third subject vehicle position calculating section 46 into the judging means 41, when the output from the vigalence degree detector 37 is of a low level, and to supply the output from the fourth subject vehicle position calculating section 47 into the judging means 41, when the output from the vigalence degree detector 37 becomes a high level.

The obstacle position estimating means 39 comprises a coordinates developing section 40, for developing positions of objective obstacles on X and Y coordinates by the signal from the distance measuring unit 32; a preestimating and calculating section 51; a comparing and calculating section 52, for comparing data preestimated last time in the preestimating and calculating section 51 with current data developed on the coordinates developing section 5, to take up the data decided as the same obstacle; a relative speed vector calculating section 53, for calculating a relative speed vector of objective obstacles on the basis of the data decided as the same obstacle; first, second, third and fourth obstacle position calculating sections 54, 55, 56 and 57; a switchover section 58 for selecting either one of outputs from the first and second obstacle position calculating sections 54 and 55 in accordance with the output signal from the vigalence degree detector 37 to supply it into the first judging means 40; and a switchover section 59 for selecting either one of outputs from the third and fourth obstacle position calculating sections 56 and 56 in accordance with the output signal from the vigalence degree detector 37 to supply it into the second judging means 41.

Figure 4:
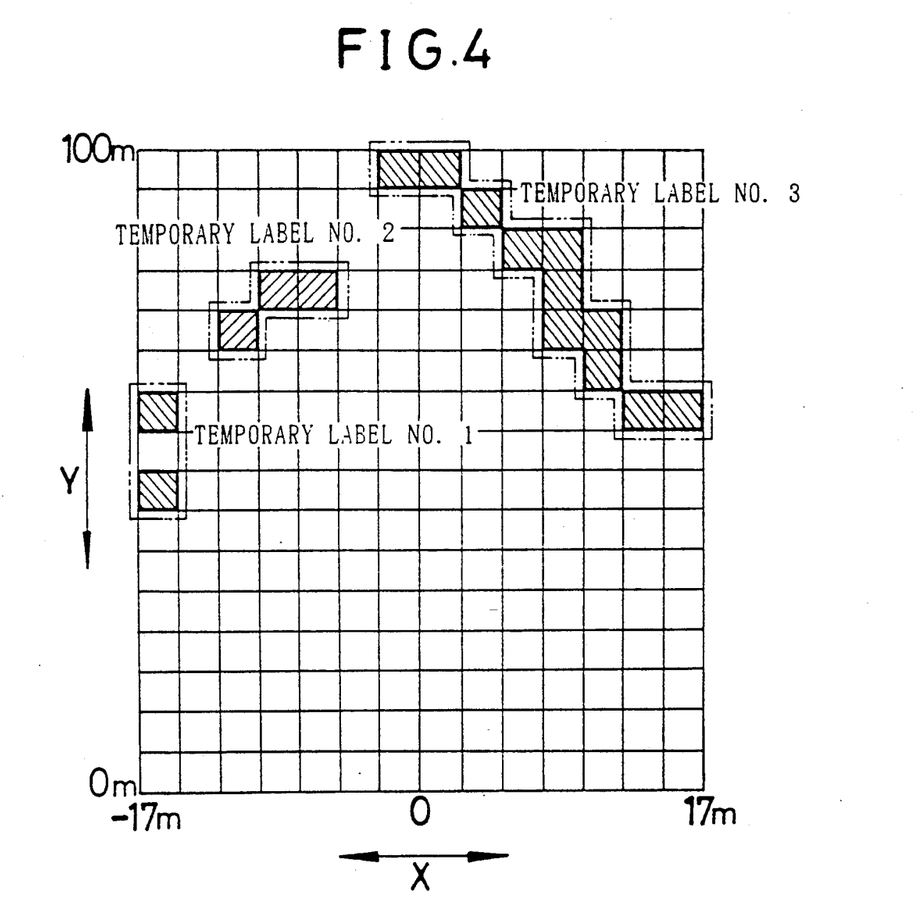
FIG. 4 is a diagram of detection data of objective obstacles on X, Y, coordinates.

In the coordinates developing section 50, the data from the distance measuring unit 32 are developed on the X and Y coordinates in which the position of the subject vehicle is defined as an origin (X=0 and Y=0); the widthwise direction of the vehicle is represented by an X axis and the travel direction of the vehicle is represented by a Y axis, and temporary labels are sequentially affixed, for example, as Nos. 1, 2, 3—to the obstacle data which are in proximity to one another on the coordinates, as shown in FIG. 4. For example, the temporary labels Nos. 1, 2 and 3 are affixed in FIG. 4, and the coordinates of the width (the length in a direction of the X axis, the longitudinal length (the length in a direction of the Y axis as well as the position of the center of gravity for every temporary labels Nos. 1, 2 and 3 are found, as given in Table 1.

TABLE 1

| Temporary label No. | Width (m) | Detection Data Longitudinal length (m) | Position of gravity center | |
|---|---|---|---|---|
| | | | X abscissa | Y ordinate |
| 1 | 2.4 | 18.8 | −15.8 | +53.1 |
| 2 | 7.3 | 12.5 | −8.5 | +76.9 |
| 3 | 19.4 | 43.8 | +8.5 | +78.1 |

The preestimating and calculating section 51 is adapted to calculate the preestimated position for every formal label on the basis of the data formally labeled in the comparing/calculating section 52 as well as the relative speed vector provided in the relative speed vector calculating section 53, thereby preestimating the width (the length in the direction of X axis), the longitudinal length (the length in the direction of Y axis, as well as the position of gravity center for every formal label, for example, as given in Table 2.

TABLE 2

| Label No. | Width (m) | Last Preestimated Data Longitudinal length (m) | Position of gravity center | |
|---|---|---|---|---|
| | | | X abscissa | Y ordinate |
| 4 | 7.3 | 15.6 | −9.0 | +76.0 |
| 8 | 2.4 | 21.2 | −15.8 | +54.0 |
| 15 | 17.0 | 50.0 | +9.7 | +70.6 |

In the comparing/calculating section 52, the current (now) data given in Table 1 is compared with the preestimated data given in Table 2, and only the current data having the position of gravity center substantially corresponding to the position of gravity center of the preestimated data is affixed with a formal label as given in Table 3 and delivered from the comparing/calculating section 52.

TABLE 3

| | | | | Position of gravity center | |
|---|---|---|---|---|---|
| Label No. Tem. label → La. No. | La. No. | Width (m) | Longitudinal length (m) | X abscissa | Y ordinate |
| 2 → 4 | | 7.3 | 12.5 | −8.5 | +76.9 |
| 1 → 8 | | 2.4 | 18.8 | −15.8 | +53.1 |
| 3 → 15 | | 19.4 | 43.8 | +8.5 | +78.1 |

Tem. La. = Temporary Label
La. = Label

In the relative speed vector calculating section 53, the relative speed vector for every formal label is calculated on the basis of the current data delivered from the comparing/calculating section 52 and the last data delivered last time from the comparing/calculating section 52. Thus, when the last data from the comparing/calculating section 52 is as given in Table 4, the position of gravity center of the current data, given in Table 3, is compared with the position of gravity center of the last data given in Table 4, thereby calculating a difference between the positions of gravity centers in the directions of X and Y axes for every formal label, as given in Table 5.

TABLE 4

| | Last Data | | | |
|---|---|---|---|---|
| | Width | Longitudinal length | Position of gravity center | |
| Label No. | (m) | (m) | X abscissa | Y ordinate |
| 4 | 7.0 | 12.0 | −9.7 | +74.9 |
| 8 | 2.4 | 18.6 | −16.8 | +52.7 |
| 15 | 18.6 | 40.4 | +8.5 | +82.2 |

TABLE 5

| | Relative Difference | |
|---|---|---|
| Label No. | Relative Value | |
| No. | X | Y |
| 4 | +1.2 | +2.0 |
| 8 | +1.0 | +0.4 |
| 15 | 0.0 | −4.1 |

The relative speed of each objective obstacle, relative to the subject vehicle, is obtained by dividing the difference for every formal label given in Table 5 by a sampling time, and the moving direction is provided from the relative difference between the directions of X and Y axes, given in Table 5.

In each of the first, second, third and fourth obstacle position calculating sections 54, 55, 56 and 57, supposing that the braking is started at a certain time, the position of the objective obstacle, after a lapse of the preset time from the braking starting time, is calculated by multiplying, by a preset time, the relative speed vector of the objective obstacle obtained by adding the vector of the subject vehicle provided in the subject vehicle vector calculating section 43, of the subject vehicle position calculating means 38, to the relative speed vector provided in the relative speed vector calculating section 53. More specifically, if the absolute speed of the objective obstacle, resulting from the addition of the relative speed to the speed of the subject vehicle, is represented by $V_2$ and the preset time is by $t_s$, and if the preset deceleration of the objective obstacle is by $x_2$, the movement distance $L_2$, in the direction of movement of the objective obstacle after a lapse of the preset time, is determined basically according to the following expression (3) in each of the first, second, third and forth obstacle position calculating sections 54, 55, 56 and 57:

$$L_2 = V_2 \cdot t_s - 0.5 \cdot x_2 \cdot \Delta t_s^2 \qquad (3)$$

Figure 5:
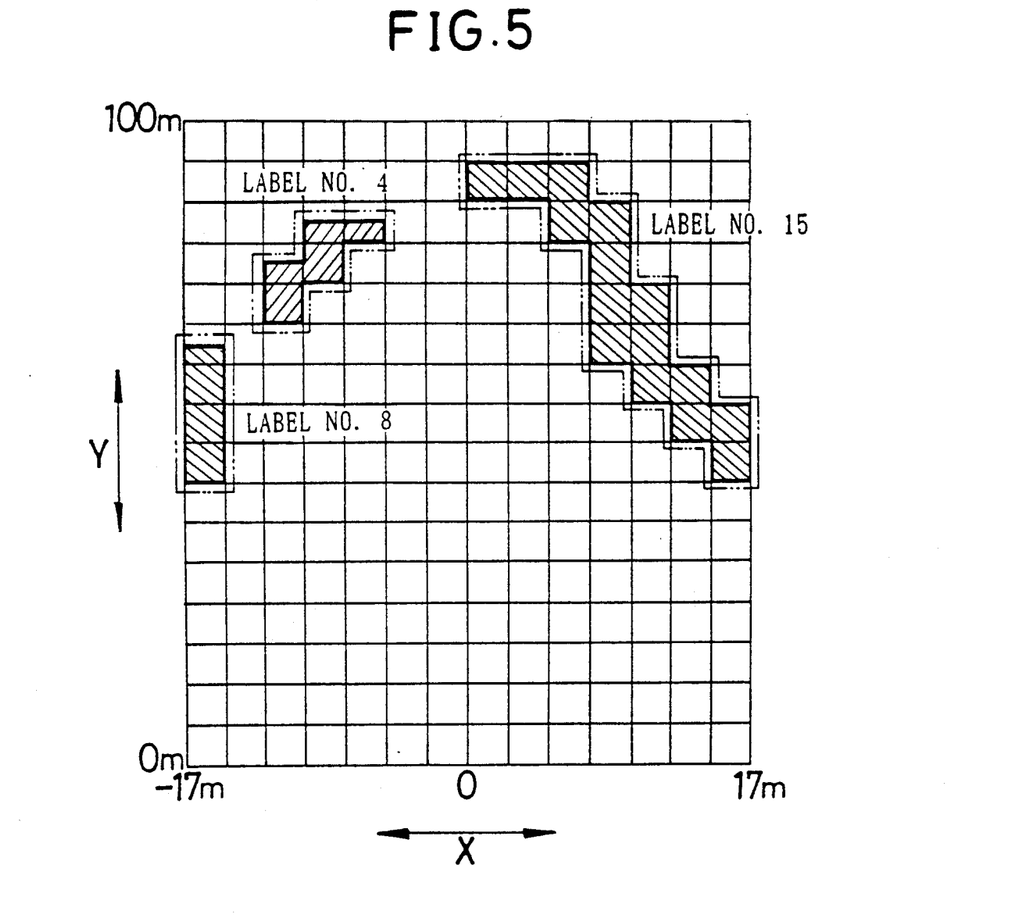
FIG. 5 is a diagram of development of estimated positions of objective obstacles on X, Y, coordinates.

Here, a first preset time $t_{s1}$ is set in the first obstacle position calculating section 54; a second preset time $t_{s2}$ is set in the second obstacle position calculating section 55; a third preset time $t_{s3}$ is set in the third obstacle position calculating section 56, and a fourth preset time $t_{s4}$ is set in the fourth obstacle position calculating section 57. In each of the first, second, third and fourth obstacle position calculating sections 54, 55, 56 and 57, the calculation according the above expression (3) is carried out by use of each of the preset times $t_{s1}$ to $t_{s4}$ independently set therein. This allows the position of the objective obstacle, after the lapse of each of the preset times $t_{s1}$, $t_{s2}$, $t_{s3}$ and $t_{s4}$ to be developed on the X and Y coordinates, as shown in FIG. 5.

The switchover section 58 is adapted to supply the output from the first obstacle position calculating section 54 into the judging means 40, when the output from the vigalence degree detector 37 is of the low level, and to supply the output from the second obstacle position calculating section 55 into the judging means 40, when the output from the vigalence degree detector 37 is of the high level. The switchover section 59 is adapted to supply the output from the third obstacle position calculating section 56 into the judging means 41, when the output from the vigalence degree detector 37 is of the low level, and to supply the output from the fourth obstacle position calculating section 57 into the judging means 41, when the output from the vigalence degree detector 37 becomes the high level.

The judging means 40 compares the position of the subject vehicle delivered from the first or second subject vehicle position calculating section 44 and 45 of the subject vehicle position estimating means 38 with the position of the objective obstacle delivered from the first or second obstacle position calculating section 54 or 55 of the obstacle position estimating means 39, and produces an operating signal, indicative of a command to operate the electric-powered hydraulic pressure producing means $A_1$, when these positions coincide with each other. More specifically, when the estimated position of the objective obstacle is superposed ont he estimated position of the subject vehicle shown in FIG. 5, the electric-powered hydraulic pressure producing means $A_1$ is operated. The judging means 41 compares the position of the subject vehicle, delivered from the third or fourth subject vehicle position calculating section 46 or 47 of the subject vehicle position estimating means 38, with the position of the objective obstacle delivered from the third or fourth obstacle position calculating section 56 or 57 of the obstacle position estimating means 39, and produces an operating signal indicative of a command to operate the alarm $A_2$, if these positions coincide with each other.

The operating of this embodiment will be described below. Supposing that the braking is started at a certain time, the position of the subject vehicle after the lapse of the preset time from such braking start time is estimated by the subject vehicle position estimating means 38. The position of the objective obstacle, after the lapse of the preset time from such braking start time point, is estimated by the obstacle position estimating means 39. The alarm $A_2$ can be operated for alarming, or both of the alarm $A_2$ and the electric-powered hydraulic pressure producing means $A_1$ can be operated by the comparison of both the estimated positions, thereby avoiding the collision of the vehicle against the objective obstacle, or providing a reduction in damage upon the collision.

More specifically, in a condition of the driver having a high vigalence degree, the first preset time $t_{s1}$ is set shorter than the time enough to avoid the collision of the vehicle against the objective obstacle by the driver's steering operating, and the third preset time $t_{s3}$ is set longer than the first preset time $t_{s1}$. When the positions of the subject vehicle and the objective obstacle, estimated by the calculations based on the third preset time $t_{s3}$ coincide with each other, the alarm $A_2$ can be operated and at the same time, the electric-powered hydraulic pressure producing means $A_1$ can be automatically operated, thereby avoiding the collision of the vehicle against the objective obstacle, or providing a reduction in damage upon the collision.

Therefore, when the collision can be avoided by the driver's steering operation, the electric-powered hydraulic pressure producing means $A_1$ cannot be operated, leading to a reduced frequency of operation of the electric-powered hydraulic pressure producing means $A_1$ and to an improved feeling of operation.

In estimating the position of the objective obstacle, in the obstacle position estimating means 39, the absolute vector of the objective obstacle is provided. This enables a judgment of whether the objective obstacle is a moving obstacle or a stationary obstacle. Such a judgment enables an application to a more precise control.

Moreover, as can be seen in the expressions (1) and (3), the preset deceleration $\alpha_1$ is used in estimating the position of the subject vehicle, and the preset deceleration $\alpha_2$ is used in estimating the position of the objective obstacle. By estimating the positions by use of such decelerations $\alpha_1$ and $\alpha_2$, a high accuracy estimation can be achieved, and thus, a high accuracy judgment of collision can be achieved.

In the condition of the driver having a low vigalence degree, the fourth preset time $t_{s4}$ is set longer than the third preset time $t_{s3}$, and when the positions of the subject vehicle and the objective obstacle, estimated by the calculations based on the fourth preset time $t_{s4}$, coincide with each other, the alarm $A_2$ is operated. when the positions of the subject vehicle and the objective obstacle, estimated by the calculations based on the second preset time $t_{s2}$ longer than the first preset time $t_{s1}$, coincide with each other, the alarm $A_2$ is operated and, at the same time, the electric-powered hydraulic pressure producing means $A_1$ is automatically operated. That is, in the condition of the driver having a low vigalence degree, the control of the operations of the electric-powered hydraulic pressure producing means $A_1$ and the alarm $A_2$ in consideration with the vigalence degree of the driver can be achieved by insuring a longer time required for avoiding the collision by the operations of the electric-powered hydraulic pressure producing means $A_1$ and the alarm $A_2$ for the avoidance of the collision.

Further, in the obstacle position estimating means 39, the development of the determined data on the X and Y coordinates, as well as the labeling on the coordinates, is carried out and, therefore, the number and distribution of objective obstacles can be correctly grasped, and the calculation of the relative speed for every label leads to an improved accuracy of estimation of the positions of the plurality of obstacles. Moreover, the amount of movement for every label is derived from a difference between the positions of gravity centers and the labels and, therefore, the calculation of the amount of movement of the objective obstacle is simplified and correct. By calculating the relative speed vector for only the substantially corresponding data, by comparing the positions of gravity centers of the last preestimated data and the current data, it is possible to ensure that a sudden variation in determined data, due to a noise, or the like, is insensitive, thereby avoiding a misjudgment.

Figure 6:
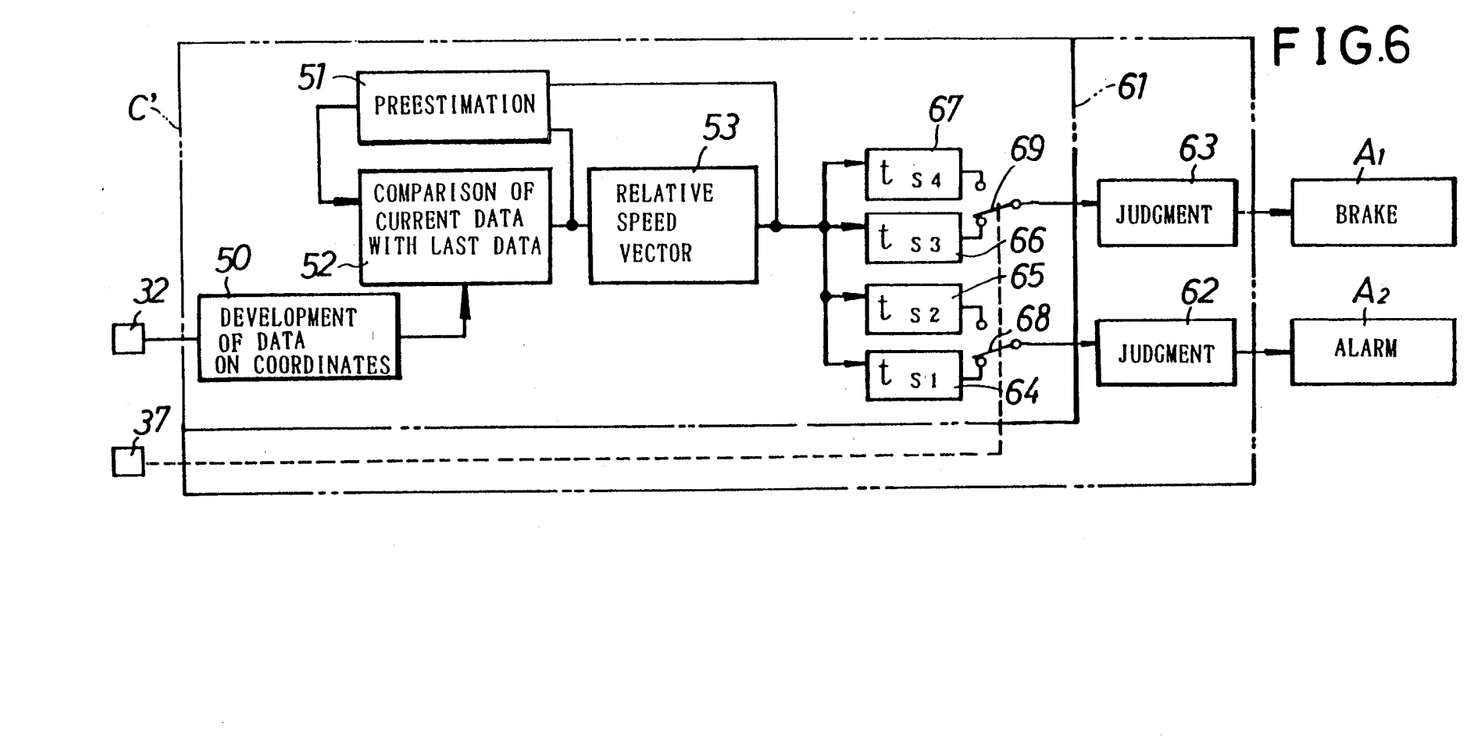
FIG. 6 is a block diagram similar to FIG. 3, but illustrating a second embodiment of the present invention.

FIG. 6 illustrate a second embodiment of the present invention, in which parts, or components, corresponding to those in the previously-described first embodiment are designated by the like reference characters.

An electronic control unit $C'$ comprises a relative position estimating means 61, and first and second judging means 62 and 63. The electronic control unit $C'$ controls the operation of the electric-powered hydraulic pressure producing means $A_1$ on the basis of signals from the distance measuring unit 32 and the vigalence degree detector 37, and also controls the operation of the alarm $A_2$.

The relative position estimating means 61 comprises a coordinates developing section 50 for developing positions of objective obstacles on the X and Y coordinates by a signal from the distance measuring unit 32; a preestimating and calculating section 51; a comparing and calculating section 52 for comparing data preestimated last in the preestimating and calculating section 51 with current (or now) data developed in the coordinates developing section 50 to take up the data judged as the same obstacle; a relative speed vector calculating section 53 for calculating the relative speed vector of the objective obstacles on the basis of the data judged as the same obstacle; first, second, third and fourth obstacle relative-position calculating sections 64, 65, 66 and 67; a switchover section 68 for selecting either one of outputs form the first and second obstacle relative-positions calculating sections 64 and 65 in accordance with the output signal from the vigalence degree detector 37 to supply it into the first judging means 62; and a switchover section 69 for selecting either one of outputs from the third and fourth obstacle relative-position calculating sections 66 and 67 in accordance with the output signal form the vigalence degree detector 37 to supply it into the second judging means 63.

In each of the first, second, third and fourth obstacle relative-position calculating sections 65, 65, 66 and 67, supposing that the braking is stared at a certain time, the relative position of the objective obstacle, after a lapse of a preset time from such braking start time, is calculated by multiplying the relative speed vector provided in the relative speed vector calculating section 53 by the preset time. More specifically, if the relative speed is represented by $\Delta V$ and the time of calculation required from the detection to the delivery is by $t_o$, and if the preset time is represented by $t_s$ and the preset deceleration of the subject vehicle by $\alpha_1$ and the preset deceleration of the objective obstacle is by $\alpha_2$, a relative distance $L_3$ between the subject vehicle and the objective obstacle, after the lapse of the preset time, is determined basically according to the following expression (4) in each of the first, second, third and fourth obstacle relative-position calculating sections 64, 65, 66 and 67.

$$L_3 = \Delta V \cdot t_s - 0.5 \cdot \{\alpha_1 \cdot (t_s - t_o)^2 - \alpha_2 \cdot t_s^2\} \qquad (4)$$

Here, a first preset time $t_{s1}$ is set in the first obstacle relative-position calculating section 64, and a second preset time $t_{s2}$ is set in the second obstacle relative-position calculating section 65. A third preset time $t_{s3}$ is set in the third obstacle relative-position calculating section 66, and a fourth preset time $t_{s4}$ is set in the fourth obstacle relative-position calculating section 67. In each of the first, second, third and fourth obstacle relative-position calculating section 64, 65, 66 and 67, the calculation according to the above expression by use of each of the preset times $t_{s1}$, $t_{s2}$, $t_{s3}$ and $t_{s4}$ independently set therein. This causes the relative position of the obstacle, after the lapse of each of the preset times $t_{s1}$, $t_{s2}$, $t_{s3}$ and $t_{s4}$, to be estimated.

The switchover section 68 is adapted to supply an output from the first obstacle relative-position calculating section 64 into the judging means 62, when the output from the vigalence degree detector 37 is of a low level, and to supply an output from the second obstacle relative-position calculating section 65 into the judging means 62, when the output from the vigalence degree detector 37, is of a high level. The switchover section 69 is adapted to supply an output from the third obstacle relative-position calculating section 66 into the judging means 63, when the output from the vigalence degree detector 37 is of the low level, and to supply an output from the fourth obstacle relative-position calculating section 67 into the judging means 63, when the output from the vigalence degree detector 37 becomes the high level.

The judging means 62 judges whether or not the relative position of the obstacle delivered from the first or second obstacle relative-position calculating section 64 or 65 is "0", and produces an operating signal, indicative of a command to operate the alarm $A_2$, when such relative position is "0". The judging means 63 judges whether or not the relative position of the obstacle delivered from the third or fourth obstacle relative-position calculating section 66 or 67 is "0", and produces an operating signal, indicative of a command to operate the electric-powered hydraulic pressure producing means $A_1$, when such relative position is "0".

With this second embodiment, the construction of the electronic control unit C' can be simplified, as compared with that in the first embodiment.

Although the embodiments of the present invention have been described in detail, it will be understood that the present invention is not intended to be limited to these embodiments, and various minor modifications in design can be made without departing from the spirit and scope of the invention defined in the claims which follow.

For example, in place of each of the decelerations $\alpha_1$ and $\alpha_2$ used in the expressions (2), (3) and (4) as a preset deceleration, and an actual deceleration of the subject vehicle and an actual deceleration of the obstacle can be used.

What is claimed is:

1. A method for estimating a position of an objective obstacle, in a vehicle equipped with a distance measuring unit which comprises a transmitting and receiving section capable of transmitting a signal toward the objective obstacle and receiving a reflected signal from the objective obstacle, and a calculating section for calculating a distance between the subject vehicle and the objective obstacle on the basis of a time between the transmission and the reception of the signals, said method comprising the steps of:

detecting the objective obstacle along a widthwise direction of the subject vehicle by the distance measuring unit;

developing detection data, detected by said distance measuring unit, on X and Y coordinates in which the widthwise direction of the subject vehicle is represented by an X axis; the longitudinal direction of the subject vehicle is represented by a Y axis, and the position of the subject vehicle is defined as an origin;

labeling each of obstacle data in such manner that the same labels are affixed to obstacle data which are in proximity to one another on said coordinates;

calculating the amount and direction of movement for every label on the basis of the last data and current data;

calculating a relative speed for every label relative to the subject vehicle by dividing the amount of movement by a sampling time; and estimating the position of the objective obstacle after a lapse of a predetermined time on the basis of a relative speed vector determined from said relative speed and said direction of movement.

2. A method for correctly estimating the position of an objective obstacle in a vehicle according to claim 1, wherein positions of gravity centers are determined for every label, and the direction and amount of movement for the every labels are calculated by comparing such position of gravity centers with one another.

3. A method for correctly estimating the position of an objective obstacle in a vehicle according to claim 2, wherein the position of gravity center for every next label is estimated on the basis of said relative speed vector, and the position of gravity center estimated last time for every label is compared with the current position of gravity center, whereby the directions and amounts of movement are calculated for only the mutually substantially corresponding labels.

* * * * *